US012762833B2

(12) United States Patent
Mori et al.

(10) Patent No.: US 12,762,833 B2
(45) Date of Patent: Oct. 13, 2026

(54) INFORMATION PROCESSING APPARATUS AND INFORMATION PROCESSING METHOD

(71) Applicant: Kioxia Corporation, Tokyo (JP)

(72) Inventors: Yumi Mori, Yokkaichi Mie (JP); Miyuki Kouda, Yokkaichi Mie (JP); Youyang Ng, Kamakura Kanagawa (JP); Takeshi Fujiwara, Yokohama Kanagawa (JP); Atsushi Maesono, Yokkaichi Mie (JP)

(73) Assignee: Kioxia Corporation, Tokyo (JP)

( * ) Notice: Subject to any disclaimer, the term of this patent is extended or adjusted under 35 U.S.C. 154(b) by 197 days.

(21) Appl. No.: 18/830,793

(22) Filed: Sep. 11, 2024

(65) Prior Publication Data

US 2025/0252709 A1 Aug. 7, 2025

(30) Foreign Application Priority Data

Feb. 1, 2024 (JP) ................................ 2024-014458

(51) Int. Cl.
*G06V 10/74* (2022.01)
*G06T 5/50* (2006.01)
(Continued)

(52) U.S. Cl.
CPC .............. *G06V 10/761* (2022.01); *G06T 5/50* (2013.01); *G06V 10/44* (2022.01); *G06V 10/764* (2022.01); *G06T 2207/20221* (2013.01)

(58) Field of Classification Search
CPC .... G06V 10/761; G06V 10/44; G06V 10/764; G06T 5/50; G06T 2207/20221
See application file for complete search history.

(56) References Cited

U.S. PATENT DOCUMENTS 11,847,389 B2 12/2023 Yokota et al.
2004/0031008 A1* 2/2004 Satoh .................... G06F 30/33 716/113

(Continued)

FOREIGN PATENT DOCUMENTS

JP 2020-204824 A 12/2020
JP 2021-169920 A 10/2021

(Continued)

OTHER PUBLICATIONS

Kensho Hara et al., "Can Spatiotemporal 3D CNNs Retrace the History of 2D CNNs and ImageNet?," IEEE/CVF Conf. on Computer Vision and Pattern Recognition, arXiv:1711.09577v2, 10 pages (2018).

*Primary Examiner* — Utpal D Shah
(74) *Attorney, Agent, or Firm* — Finnegan, Henderson, Farabow, Garrett & Dunner, LLP

(57) ABSTRACT

An information processing apparatus comprises processing circuitry that acquires output data obtained by performing an experiment or simulation based on an input parameter and a physical quantity of the output data, inputs the output data to a learned model, extracts a feature amount of the output data, generates a first reference feature amount, generates a second reference feature amount based on the physical quantity of the output data and a degree of similarity between the first reference feature amount and the feature amount of the output data, calculates degree of similarity between the second reference feature amount and the feature amount of the output data, sets an evaluation value based on the calculated degree of similarity and the physical quantity of the output data, determines an input parameter for a next experiment or simulation based on the evaluation value, and repeats the above processings until a predetermined condition is satisfied.

20 Claims, 13 Drawing Sheets

1: INFORMATION PROCESSING APPARATUS

(51) Int. Cl.
*G06V 10/44* (2022.01)
*G06V 10/764* (2022.01)

(56) References Cited

U.S. PATENT DOCUMENTS

| | | | | |
|---|---|---|---|---|
| 2016/0026915 | A1 | 1/2016 | Delp | |
| 2020/0050717 | A1* | 2/2020 | Kiribuchi | G06F 30/20 |
| 2021/0248293 | A1* | 8/2021 | Yokota | G06N 3/0495 |
| 2022/0155232 | A1 | 5/2022 | Liu et al. | |
| 2022/0207401 | A1* | 6/2022 | Ito | G06N 20/10 |
| 2022/0244685 | A1* | 8/2022 | Noda | G05B 13/0265 |
| 2023/0377139 | A1 | 11/2023 | Chiang et al. | |
| 2024/0020843 | A1 | 1/2024 | Padilha et al. | |
| 2025/0036835 | A1* | 1/2025 | Kar | G06F 18/24155 |

FOREIGN PATENT DOCUMENTS

| | | | |
|---|---|---|---|
| JP | 2022-41434 | A | 3/2022 |
| JP | 2022-119321 | A | 8/2022 |
| JP | 7344149 | B2 | 9/2023 |
| JP | 2023-542047 | A | 10/2023 |
| JP | 2023-550296 | A | 12/2023 |

* cited by examiner

1: INFORMATION PROCESSING APPARATUS

INFORMATION PROCESSING APPARATUS AND INFORMATION PROCESSING METHOD

CROSS REFERENCE TO RELATED APPLICATIONS

This application is based upon and claims the benefit of priority from the prior Japanese Patent Application No. 2024-014458, filed on Feb. 1, 2024, the entire contents of which are incorporated herein by reference.

FIELD

Embodiments described herein relate generally to an information processing apparatus and an information processing method.

BACKGROUND

When an operation of a complicated event is simulatively executed by a simulator, output data may be multi-dimensional. In a case where the output data is multi-dimensional, enormous calculation processing is required to update input parameters.

DETAILED DESCRIPTION

In general, according to the embodiment, an information processing apparatus comprises processing circuitry. The processing circuitry is configured to acquire output data obtained by performing an experiment or simulation based on an input parameter and a physical quantity of the output data, input the output data to a learned model to extract a feature amount of the output data, generate a first reference feature amount, generate a second reference feature amount based on the physical quantity of the output data and a degree of similarity between the first reference feature amount and the feature amount of the output data, calculate a degree of similarity between the second reference feature amount and the feature amount of the output data, to set an evaluation value based on the calculated degree of similarity and the physical quantity of the output data, determine an input parameter for a next experiment or simulation based on the evaluation value, and repeat processing of acquiring the output data, inputting the output data, to extract the feature amount, generating the first reference feature amount, generating the second reference feature amount, calculating the degree of similarity to set the evaluation value, and determining the input parameter until a predetermined condition is satisfied.

Hereinafter, embodiments of an information processing apparatus and an information processing method will be described with reference to the drawings. Although main components of the information processing apparatus and the information processing method will be mainly described below, the information processing apparatus and the information processing method may include components and functions that are not illustrated or described. The following description does not exclude the components and functions that are not illustrated or described.

(Overall Configuration of Information Processing Apparatus)

Figure 1:
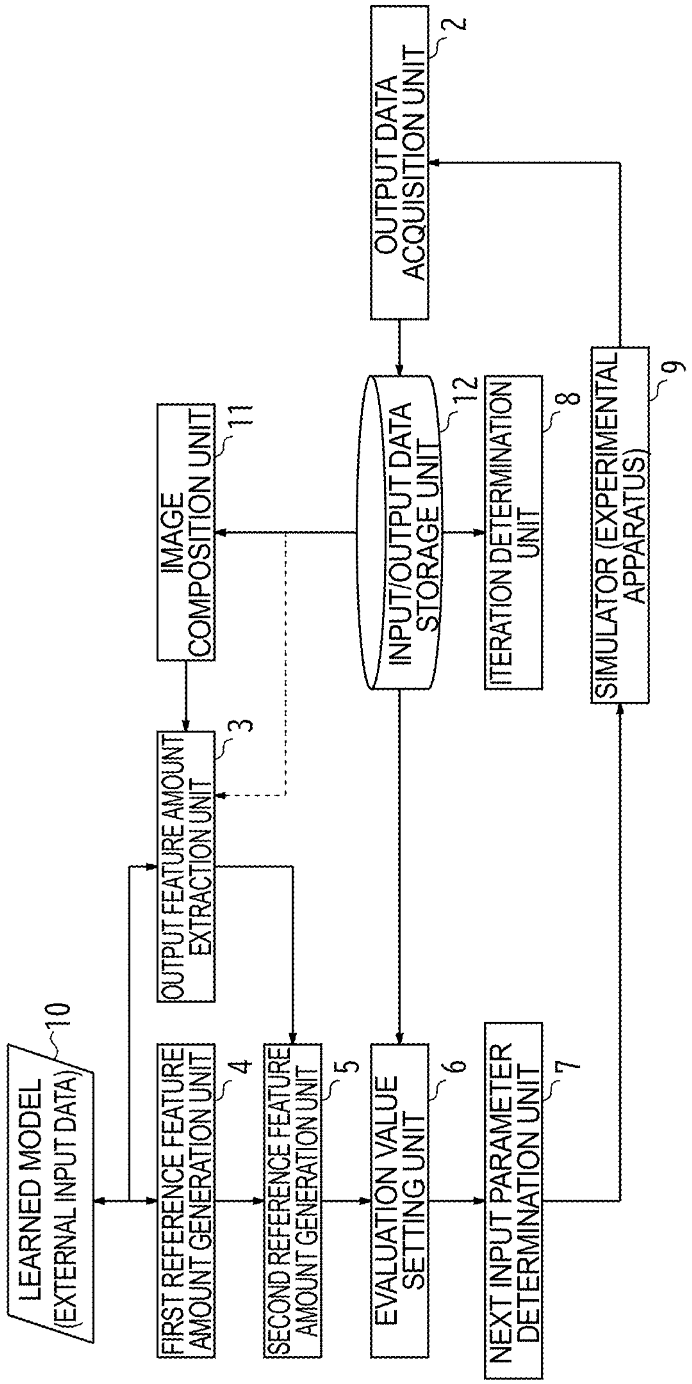
FIG. 1 is a block diagram illustrating an overall configuration of an information processing apparatus according to an embodiment.

FIG. 1 is a block diagram illustrating an overall configuration of an information processing apparatus 1 according to an embodiment. The information processing apparatus 1 according to the embodiment includes an output data acquisition unit 2, an output feature amount extraction unit 3, a first reference feature amount generation unit 4, a second reference feature amount generation unit 5, an evaluation value setting unit 6, a next input parameter determination unit 7, and an iteration determination unit 8.

The information processing apparatus 1 according to the embodiment is characterized by determining an input parameter of a simulator 9 or an experimental apparatus, for example. The content of a simulation or an experiment performed by the simulator 9 or the experimental apparatus is not limited. For example, a structure, a surface shape, an electrical characteristic, or the like of a semiconductor device manufactured by a semiconductor manufacturing apparatus may be simulated or experimented. The processing operation of the information processing apparatus 1 can be performed by processing circuitry such as a processor.

The output data acquisition unit 2 acquires output data obtained by performing an experiment or simulation based on the input parameter and a physical quantity of the output data. The output data acquisition unit 2 acquires one or more input parameters. The input parameters are various parameters such as pressure, voltage, temperature, and process condition. The physical quantity is a value or quantity of pressure, voltage, temperature, process condition, and the like. In a more specific example, the physical quantity includes a flow rate or concentration of a processing medium used in a manufacturing apparatus that manufactures a processing target. The specific type and number of input parameters and physical quantities are not limited.

The output feature amount extraction unit 3 inputs, to a learned model 10, output data including a composite output image combined by an image composition unit 11 or output data acquired by the output data acquisition unit 2 and stored in an input/output data storage unit 12, and extracts a feature amount of the output data. The output data includes, for example, an output image obtained by the simulator 9 or an experiment. The model 10 outputs a feature amount of input data. The model 10 is, for example, various network models capable of performing machine learning, such as a convolutional neural network (CNN) or a generative adversarial network (GAN). A detailed structure of the model 10 is not limited. The model 10 may be provided outside the information processing apparatus 1. In this case, the feature amount output from the model 10 is input to the information processing apparatus 1 as external input data. Hereinafter, an example in which the output data includes the output image and the output feature amount extraction unit 3 extracts the feature amount of the output image will be mainly described.

The first reference feature amount generation unit 4 generates a first reference feature amount. As will be described later, the first reference feature amount generation unit 4 generates the first reference feature amount in consideration of user's knowledge based on a reference image given in advance and the physical quantity of the output data (for example, the output image). Alternatively, the first reference feature amount generation unit 4 generates the first reference feature amount based on the feature amount of one or more pieces of output data corresponding to the physical quantity satisfying a predetermined standard among the physical quantities of a plurality of pieces of output data (for example, the output images) without using the reference image. In a more specific example, the first reference feature amount generation unit 4 may set, as the first reference feature amount, a centroid of the feature amounts of two or more output images corresponding to physical quantities satisfying a predetermined condition. Alternatively, the first reference feature amount generation unit 4 may generate the first reference feature amount by averaging the feature amounts of two or more pieces of output data corresponding to physical quantities satisfying the predetermined condition. Alternatively, the first reference feature amount generation unit 4 may set, as the first reference feature amount, the feature amount of the output data corresponding to the physical quantity satisfying the predetermined standard.

The second reference feature amount generation unit 5 calculates the degree of similarity between the first reference feature amount and the feature amount of the output data (for example, the output image), and generates the second reference feature amount based on the degree of similarity and the physical quantity of the output data.

The evaluation value setting unit 6 calculates the degree of similarity between the second reference feature amount and the feature amount of the output data, and sets an evaluation value based on the calculated degree of similarity and the physical quantity of the output data. The evaluation value refers to a combination of the degree of similarity and the corresponding physical quantity.

The next input parameter determination unit 7 determines an input parameter for the next experiment or simulation based on the evaluation value.

The iteration determination unit 8 repeats the processing of the output data acquisition unit 2, the output feature amount extraction unit 3, the first reference feature amount generation unit 4, the second reference feature amount generation unit 5, the evaluation value setting unit 6, and the next input parameter determination unit 7 until a predetermined condition is satisfied. The predetermined condition may be satisfied, for example, in a case where the number of times of execution of the experiment or simulation reaches a predetermined limit number, in a case where an elapsed time from the start of the experiment or simulation exceeds a predetermined limit time, or in a case where the above-described evaluation value reaches a predetermined threshold.

The information processing apparatus 1 according to the embodiment may include the image composition unit 11. After classifying a plurality of output images into a plurality of channels, the image composition unit 11 combines the output images of the channels to generate a composite output image. The channel is allocated, for example, for each separate processing target. As will be described later, the image composition unit 11 may reduce a data amount by performing grayscale conversion on the plurality of output images and then combine the plurality of output images. In addition, the image composition unit 11 may combine a plurality of output images generated by changing a weight for each of the plurality of channels to generate a composite output image.

The information processing apparatus 1 according to the embodiment may include the input/output data storage unit 12. The input/output data storage unit 12 stores, as a set, the output data acquired by the output data acquisition unit 2 and the input parameter corresponding to the output data. Since the output data includes the output image and the physical quantity, the input/output data storage unit 12 stores the output image, the physical quantity, and the input parameter as a set. The output data stored in the input/output data storage unit 12 is input to the image composition unit 11. In addition, the output data stored in the input/output data storage unit 12 may be input to the output feature amount extraction unit 3 and the evaluation value setting unit 6. In addition, the composite output image combined by the image composition unit 11 may be input to the output feature amount extraction unit 3.

Figure 2:
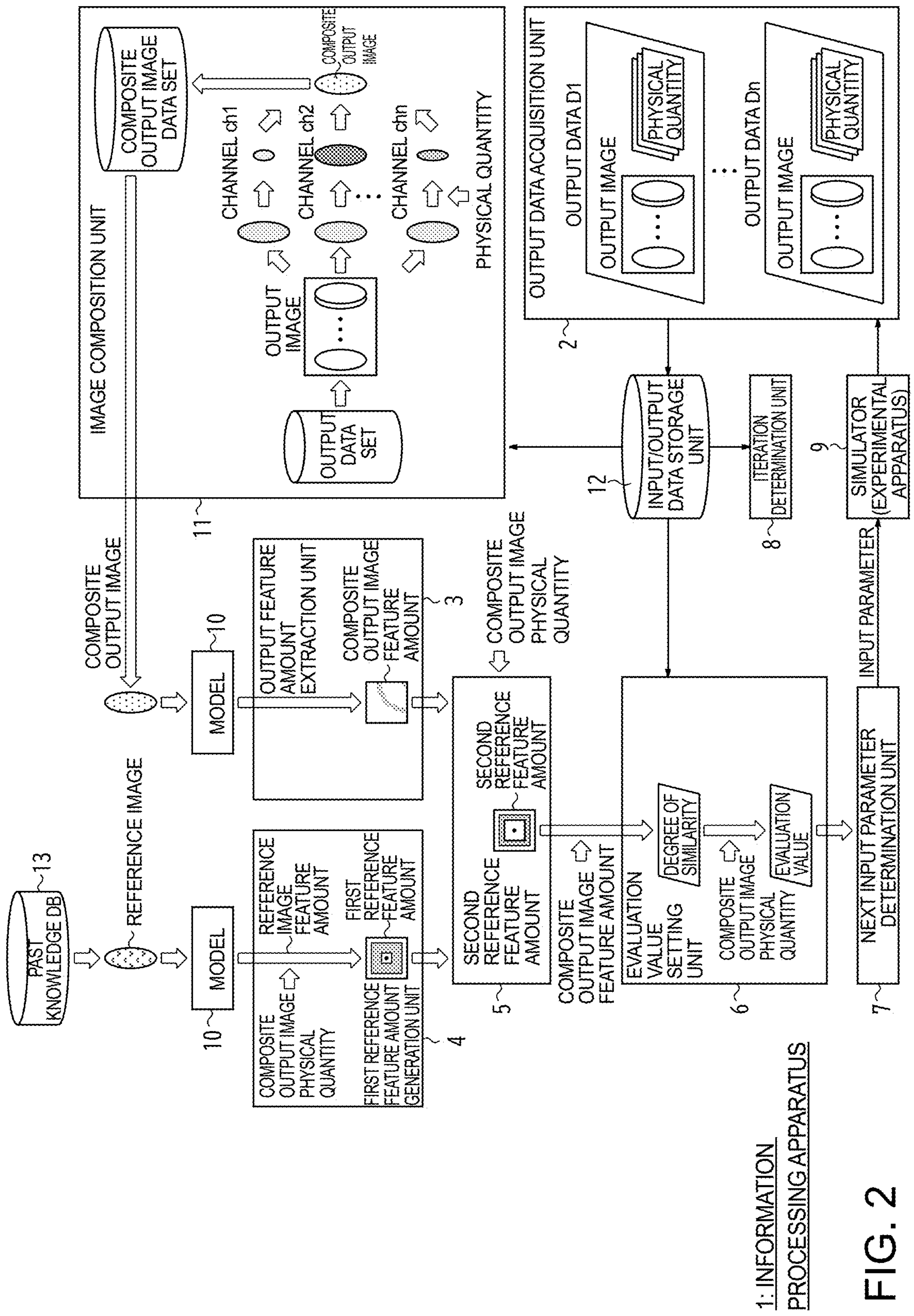
FIG. 2 is a diagram for explaining a processing operation of the information processing apparatus according to the embodiment.

FIG. 2 is a diagram for explaining a processing operation of the information processing apparatus 1 according to the embodiment. FIG. 2 illustrates processing of optimizing an input parameter of the composite output image combined by the image composition unit 11.

For example, the first reference feature amount generation unit 4 inputs the reference image to the learned model 10, and generates the first reference feature amount based on a feature amount f0 of the reference image output from the model 10 and the physical quantity of the composite output image. The reference image is read from, for example, a past knowledge database (past knowledge DB) 13.

The output feature amount extraction unit 3 inputs the composite output image to the learned model 10 and extracts the feature amount of the composite output image.

The second reference feature amount generation unit 5 generates the second reference feature amount based on the degree of similarity between the first reference feature amount and the feature amount of the composite output image and the physical quantity of the composite output image.

The evaluation value setting unit 6 compares the second reference feature amount with the feature amount of the composite output image, and calculates the degree of similarity between the second reference feature amount and the composite output image. Next, the evaluation value setting unit 6 sets an evaluation value in which the degree of similarity and the physical quantity of the composite output image are made into a set.

The next input parameter determination unit 7 determines an input parameter for the next experiment or simulation based on the evaluation value. The determined input parameter is input to the experimental apparatus or the simulator 9.

The output data acquisition unit 2 acquires output data indicating an experimental result or a simulation result by the experimental apparatus or the simulator 9 in association with the input parameter determined by the next input parameter determination unit 7.

(Procedure for Determining Next Input Parameter)

Figure 3:
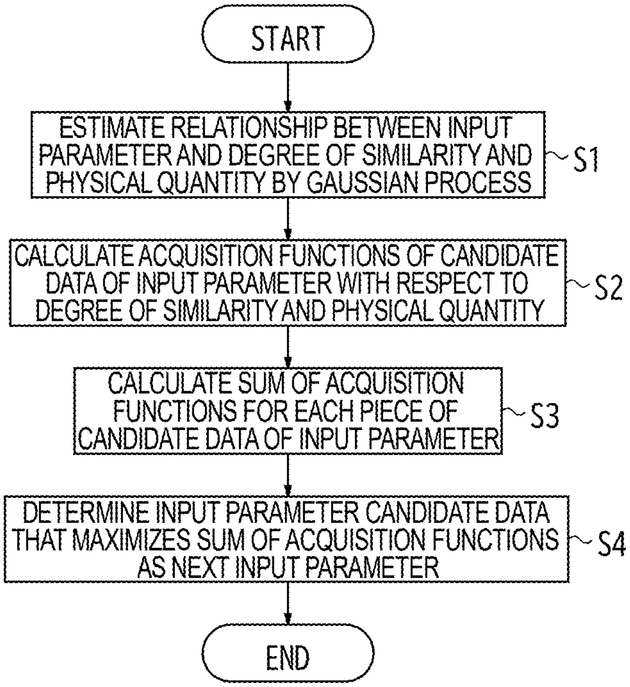
FIG. 3 is a flowchart illustrating an example of a processing procedure of a next input parameter determination unit.

FIG. 3 is a flowchart illustrating an example of a processing procedure of the next input parameter determination unit 7. The flowchart of FIG. 3 illustrates an example of performing Bayesian optimization. First, a relationship between the input parameter and the degree of similarity and the physical quantity is estimated by the Gaussian process (step S1).

Next, acquisition functions of candidate data of the input parameter with respect to the degree of similarity and the physical quantity of the composite output image in the evaluation value are calculated based on the estimation result (step S2). Next, the sum of acquisition functions is calculated for each piece of candidate data of the input parameter (step S3). Next, the input parameter candidate data that maximizes the sum of the acquisition functions is determined as the next input parameter (step S4).

(Processing Operation of Second Reference Feature Amount Generation Unit 5)

Figure 4:
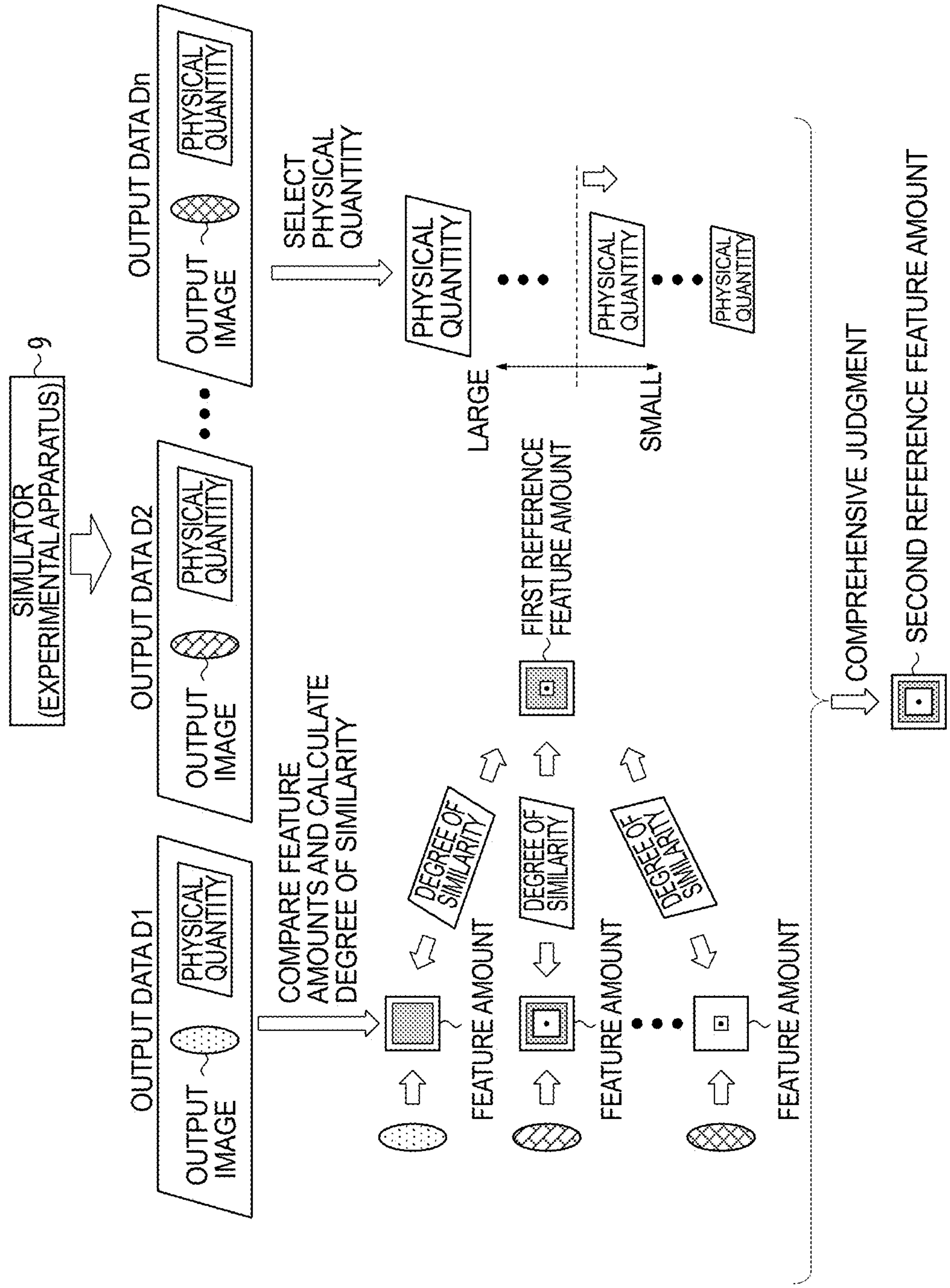
FIG. 4 is a diagram for explaining a processing operation of a second reference feature amount generation unit.

FIG. 4 is a diagram for explaining a processing operation of the second reference feature amount generation unit 5. The experimental apparatus or the simulator 9 outputs a plurality of pieces of output data D1 to Dn. Each piece of the output data D1 to Dn may include a physical quantity corresponding to one output image, or may include a physical quantity corresponding to a composite output image obtained by combining a plurality of output images.

Figure 5:
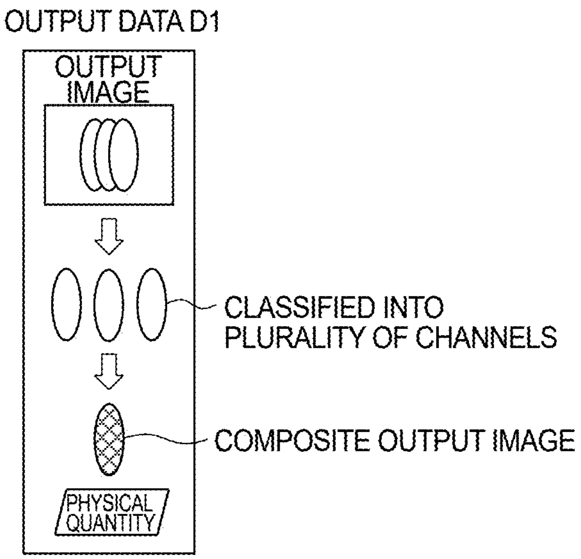
FIG. 5 is a diagram illustrating an example in which each piece of output data input to the second reference feature amount generation unit in FIG. 4 includes a physical quantity corresponding to a composite output image.

FIG. 5 is a diagram illustrating an example in which each piece of the output data D1 to Dn input to the second reference feature amount generation unit 5 in FIG. 4 includes the physical quantity corresponding to the composite output image. FIG. 5 illustrates a data structure of the output data D1, and the same applies to the output data D2 to Dn. In the example of FIG. 5, the output data D1 includes three output images. The three output images have different types of information, for example. The type of information indicates, for example, distributions of different physical quantities. More specifically, the type of information includes, for example, a flow rate map and a concentration map of a processing target. In this case, the output image includes an image of the flow rate map and an image of the concentration map.

As illustrated in FIG. 5, when each piece of the output data D1 to Dn includes the physical quantity corresponding to the composite output image, the second reference feature amount generation unit 5 calculates the degree of similarity between the feature amount of the composite output image and the first reference feature amount.

In addition, the second reference feature amount generation unit 5 generates the second reference feature amount based on the degree of similarity between the first reference feature amount and the feature amount of the composite output image and the physical quantity satisfying a predetermined condition among the physical quantities of the composite output images.

The predetermined condition is, for example, a condition that the physical quantity is three or less when a magnitude relationship of the physical quantity is taken as an example. In this case, the second reference feature amount generation unit 5 generates the second reference feature amount in consideration of the degree of similarity between the feature amount of each output image having a physical quantity of three or less and the first reference feature amount.

Note that FIGS. 4 and 5 illustrate an example in which the composite output image is input to the second reference feature amount generation unit 5, but an output image that is not combined may be input to the second reference feature amount generation unit 5.

(Generating First Reference Feature Amount without User's Knowledge and Reference Image)

Figure 6:
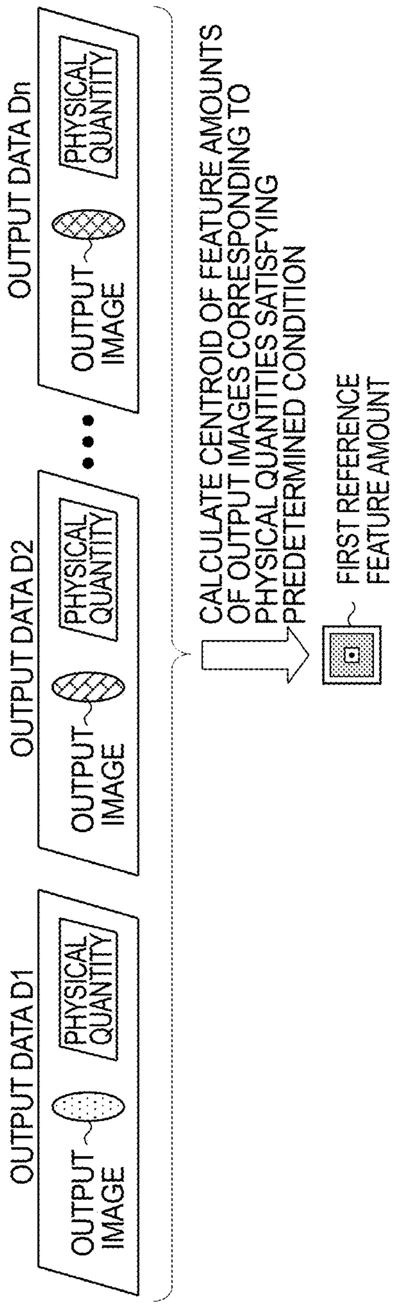
FIG. 6 is a diagram for explaining a processing operation in which a first reference feature amount generation unit generates a first reference feature amount without a reference image.

In addition to generating the first reference feature amount from the reference image, the first reference feature amount generation unit 4 can generate the first reference feature amount without user's knowledge and without using the reference image. FIG. 6 is a diagram for explaining a processing operation in which the first reference feature amount generation unit 4 generates the first reference feature amount without the reference image.

For example, the first reference feature amount generation unit 4 sets, as the first reference feature amount, the centroid of two or more feature amounts obtained by inputting, to the learned model 10, two or more output images corresponding to physical quantities satisfying a predetermined condition among a plurality of physical quantities included in a plurality of pieces of output data output from the experimental apparatus or the simulator 9. The predetermined condition is, for example, a condition that the physical quantity is three or less when a magnitude relationship of the physical quantity is taken as an example. Instead of calculating the centroid of two or more feature amounts, an average value of two or more feature amounts may be used as the first reference feature amount.

As a result, it is possible to generate the first reference feature amount without requiring user's knowledge and without preparing the reference image in advance, and it is possible to save the user's trouble.

(Generating First Reference Feature Amount and Second Reference Feature Amount by Excluding Some Feature Amounts)

In generating at least one of the first reference feature amount and the second reference feature amount, at least one of the first reference feature amount and the second reference feature amount can be generated after excluding some feature amounts.

Figure 7:
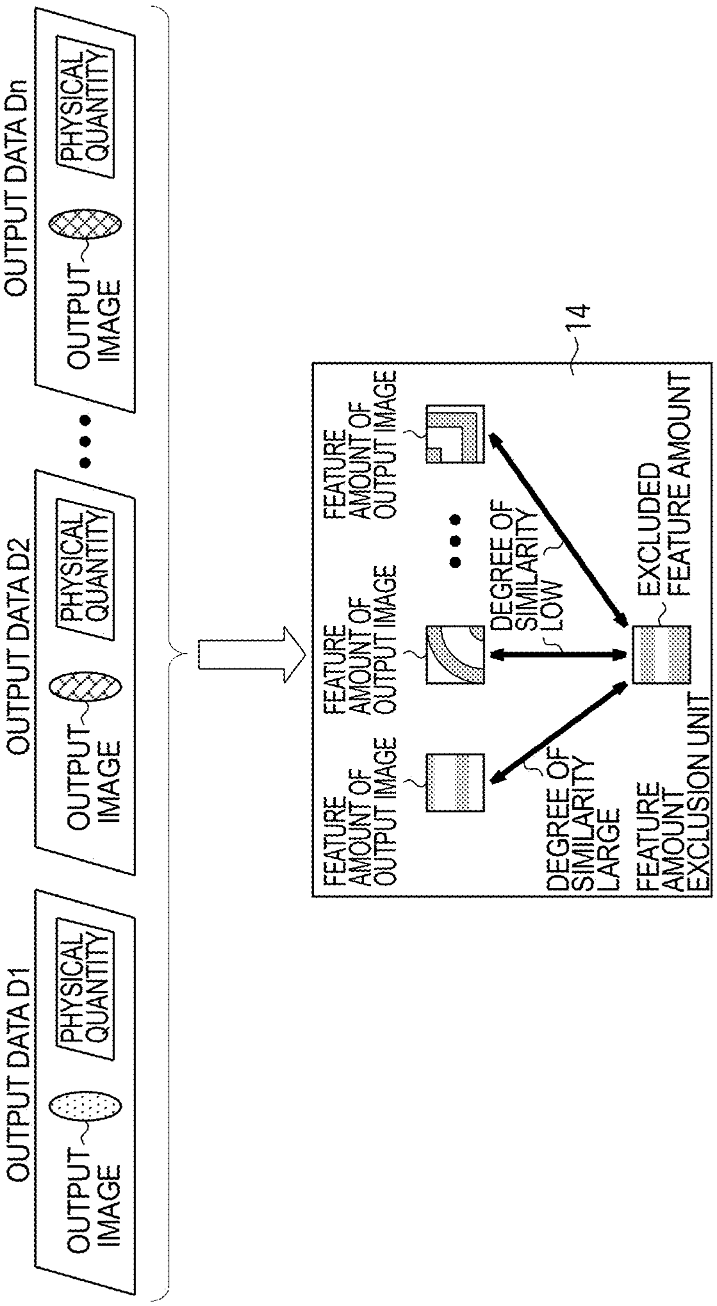
FIG. 7 is a diagram for explaining a processing operation of a feature amount exclusion unit that generates the first reference feature amount and the second reference feature amount by excluding some feature amounts.

FIG. 7 is a diagram for explaining a processing operation of a feature amount exclusion unit 14 that generates the first reference feature amount and the second reference feature amount by excluding some feature amounts.

The feature amount exclusion unit 14 specifies in advance a feature amount that is not desirable as the first reference feature amount or the second reference feature amount, and sets the specified feature amount as an excluded feature amount. For example, the feature amount exclusion unit 14 calculates the degree of similarity between a plurality of feature amounts obtained by inputting, to the learned model 10, a plurality of output images included in a plurality of pieces of output data output from the experimental apparatus or the simulator 9 and the excluded feature amount, and excludes a feature amount having a high degree of similarity exceeding a predetermined threshold.

At least one of the first reference feature amount generation unit 4 and the second reference feature amount generation unit 5 generates at least one of the first reference feature amount and the second reference feature amount from the feature amount other than the feature amount excluded by the feature amount exclusion unit 14.

In this manner, by providing the feature amount exclusion unit 14, an inappropriate feature amount can be excluded in advance, and the processing of the first reference feature amount generation unit 4 and the second reference feature amount generation unit 5 can be efficiently performed.

(Change of Contribution Rate of Physical Quantity)

In a case where a plurality of pieces of output data including a plurality of output images and a plurality of corresponding physical quantities are input to the output feature amount extraction unit 3, a contribution rate can be set for each of the plurality of physical quantities, and the use rate of each physical quantity can be updated every experiment or simulation according to the contribution rate of each physical quantity.

Figure 8:
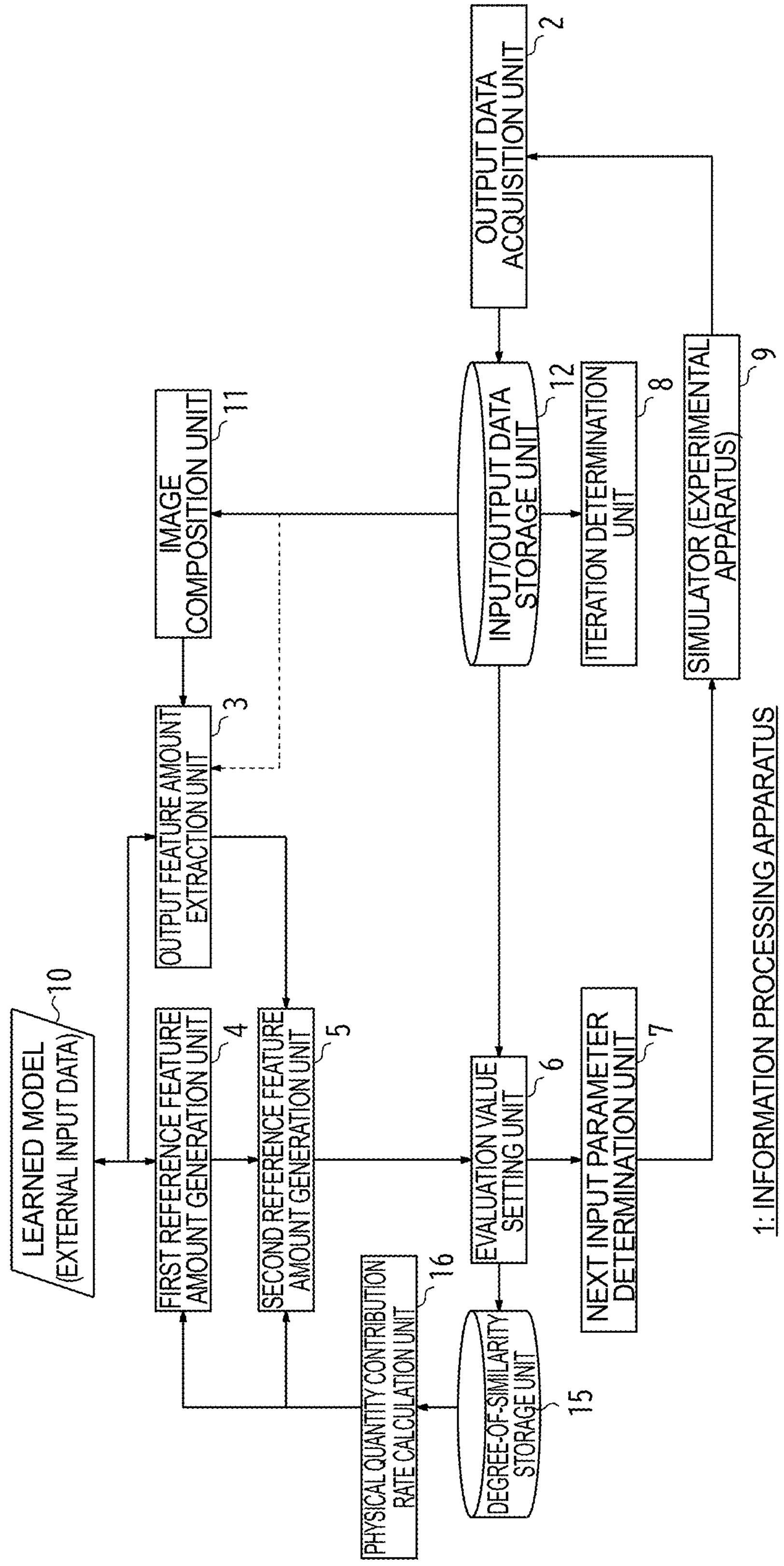
FIG. 8 is a block diagram illustrating an overall configuration of an information processing apparatus according to a modification of the embodiment.
Figure 9:
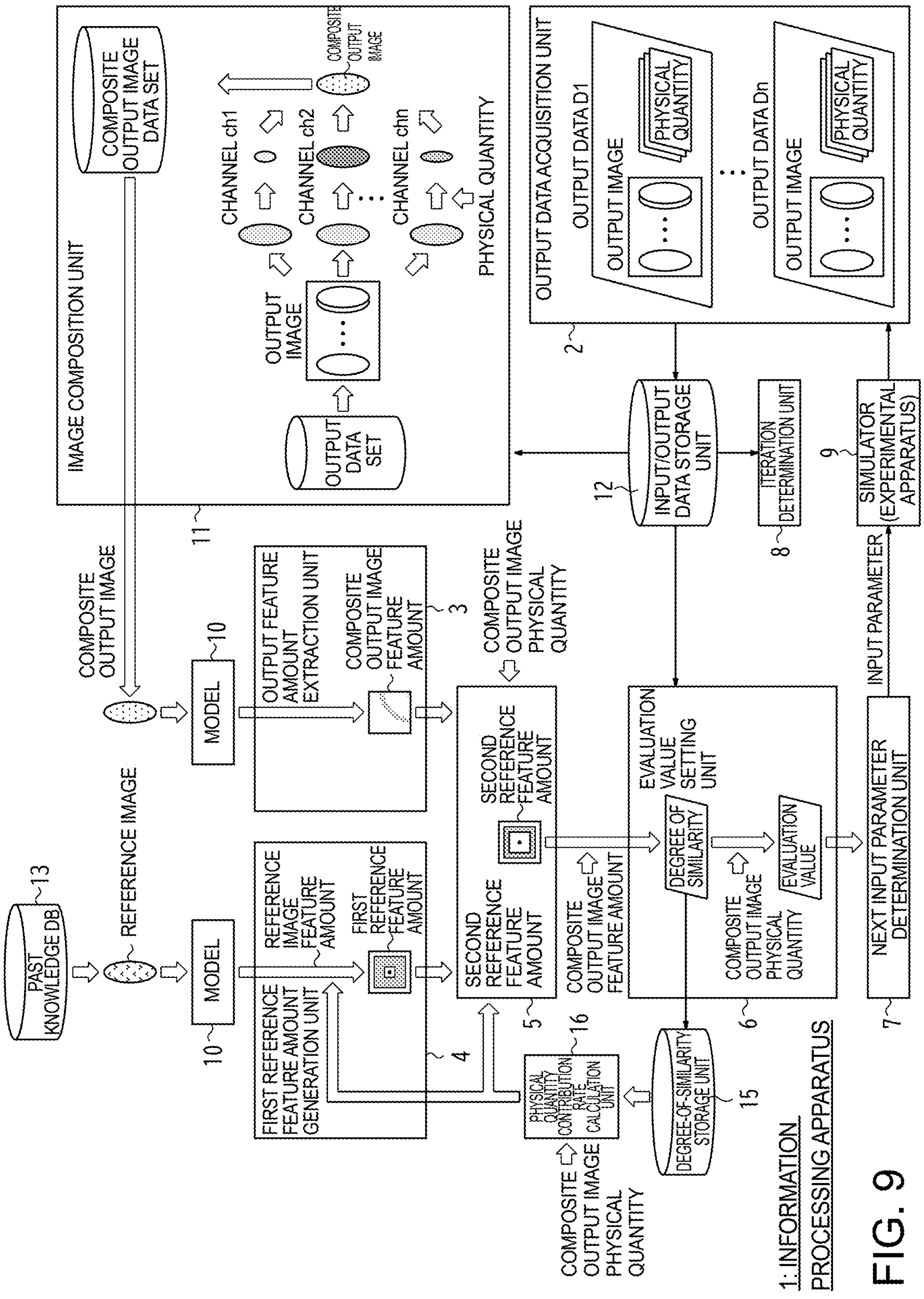
FIG. 9 is a diagram for explaining a processing operation of the information processing apparatus according to the modification.

FIG. 8 is a block diagram illustrating an overall configuration of an information processing apparatus 1 according to a modification of the embodiment, and FIG. 9 is a diagram for explaining a processing operation of the information processing apparatus 1 according to the modification.

As illustrated in FIGS. 8 and 9, the information processing apparatus 1 according to the modification includes a degree-of-similarity storage unit 15 and a physical quantity contribution rate calculation unit 16 in addition to the configurations of FIGS. 1 and 2.

A plurality of degrees of similarity between the feature amounts of a plurality of output images extracted by the output feature amount extraction unit 3 and the second reference feature amount are calculated by the evaluation value setting unit 6. The degree-of-similarity storage unit 15 stores the calculated degree of similarity in association with a variation of each physical quantity corresponding to each output image. The physical quantity contribution rate calculation unit 16 calculates the contribution rates of the plurality of physical quantities based on the plurality of calculated degrees of similarity and the variations of the plurality of physical quantities corresponding to the plurality of output images. For example, a lower contribution rate is calculated as the physical quantity has a larger variation.

The first reference feature amount generation unit 4 generates the first reference feature amount using each physical quantity at a use rate according to the contribution rate of each physical quantity calculated by the physical quantity contribution rate calculation unit 16.

The second reference feature amount generation unit 5 uses each physical quantity at the use rate according to the contribution rate of each physical quantity calculated by the physical quantity contribution rate calculation unit 16, and generates the second reference feature amount based on the degree of similarity between the first reference feature amount and the feature amount of each output image. Here, as the contribution rate of each physical quantity, the contribution rate used in the first reference feature amount generation unit 4 may be used as it is, or the contribution rate input from the physical quantity contribution rate calculation unit 16 may be used again.

Figure 10:
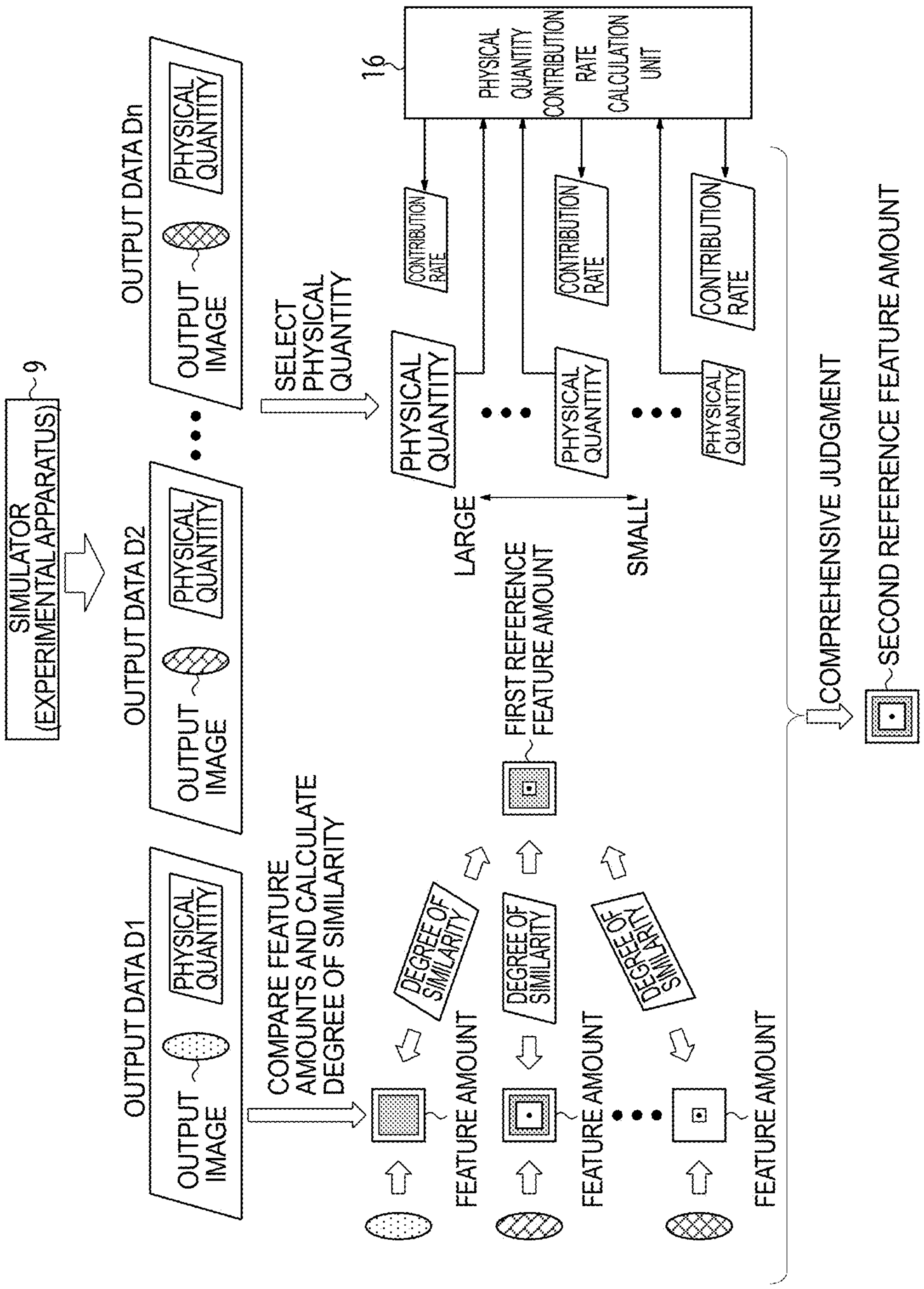
FIG. 10 is a diagram for explaining a method of generating the second reference feature amount based on a contribution rate of a physical quantity.

FIG. 10 is a diagram for explaining a method of generating the second reference feature amount based on the contribution rate of the physical quantity. The degree-of-similarity storage unit 15 stores, as a set, the variation of each physical quantity included in the output data of the experimental apparatus or the simulator 9 obtained in the process of performing the past optimization processing of the input parameter and the degree of similarity calculated by the evaluation value setting unit 6.

The physical quantity contribution rate calculation unit 16 defines the contribution rate of each physical quantity based on the degree of similarity and the variation of each physical quantity stored in the degree-of-similarity storage unit 15.

Thereafter, when new output data is output from the simulator 9 or the experimental apparatus, the physical quantity contribution rate calculation unit 16 determines the contribution rate of each physical quantity using the variation of each physical quantity corresponding to each output image included in each piece of the output data.

The second reference feature amount generation unit 5 changes the use rate of each physical quantity based on the contribution rate of each physical quantity determined by the physical quantity contribution rate calculation unit 16, and generates the second reference feature amount based on the degree of similarity described above.

(First Example of Image Composition)

The image composition unit 11 can classify a plurality of output images included in a plurality of pieces of output data into different channels, perform image processing on the output images, and then combine the output images to generate a composite output image.

Figure 11:
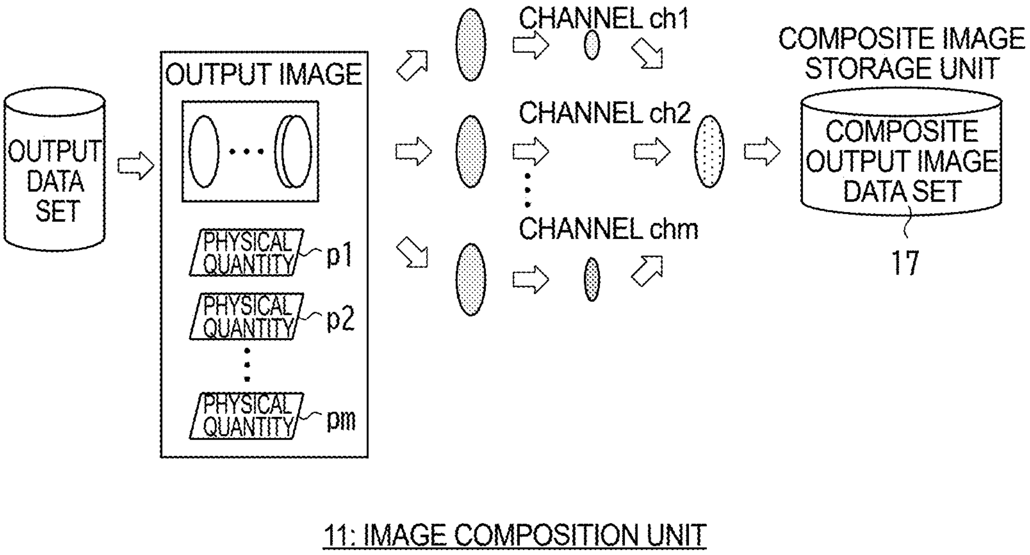
FIG. 11 is a diagram illustrating image composition processing according to a first example performed by an image composition unit.

FIG. 11 is a diagram illustrating image composition processing according to a first example performed by the image composition unit 11. For example, an output data set including one or more pieces of output data is input from the input/output data storage unit 12 in FIG. 1 to the image composition unit 11. FIG. 11 illustrates one piece of output data D included in the output data set. The output data D includes a plurality of output images and a plurality of physical quantities. The physical quantity is provided in association with each of the plurality of output images. The plurality of output images included in the output data D are, for example, output images relating to a plurality of processing targets manufactured in one lot by a manufacturing apparatus.

In the first example, the plurality of output images are classified into different channels ch1 to chm. The image composition unit 11 combines the output images classified into the channels ch1 to chm in a state of holding information of connection between the output images to generate a composite output image. The generated composite output image is stored in a composite image storage unit 17.

The output feature amount extraction unit 3 illustrated in FIG. 1 extracts the feature amount of the composite output image stored in the composite image storage unit 17.

Figure 12:
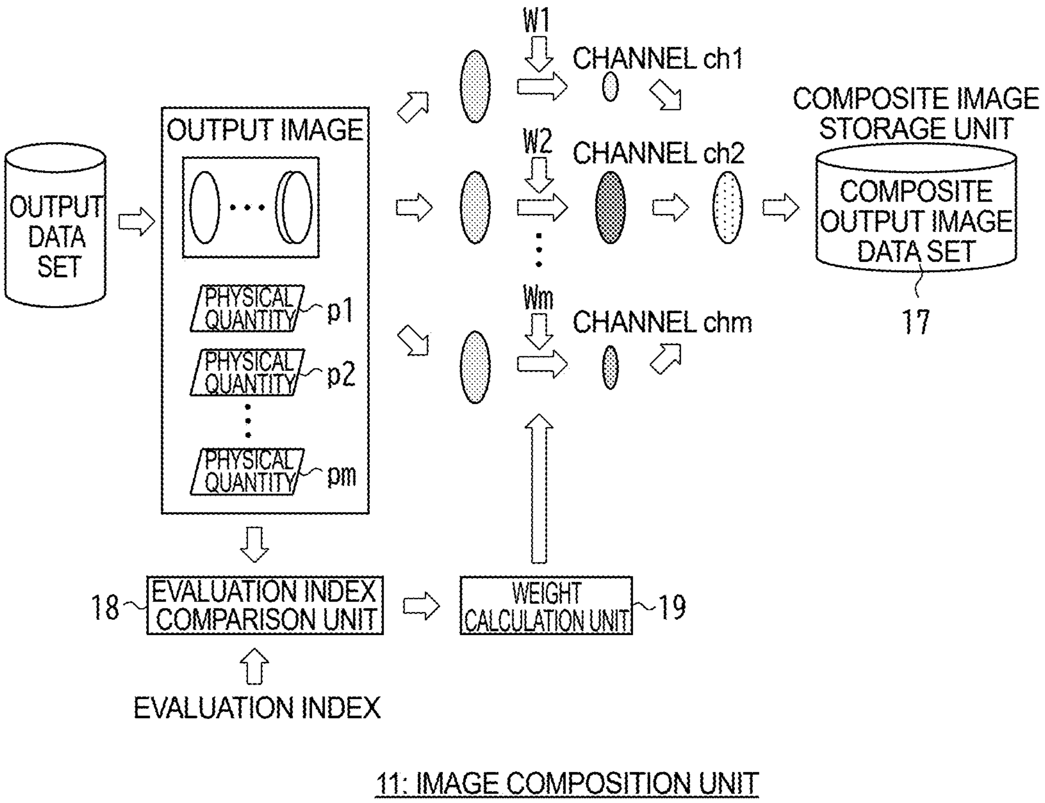
FIG. 12 is a diagram illustrating image composition processing according to a second example performed by the image composition unit.

FIG. 12 is a diagram illustrating image composition processing according to a second example performed by the image composition unit 11. The image composition unit 11 in FIG. 12 includes an evaluation index comparison unit 18 and a weight calculation unit 19.

The evaluation index comparison unit 18 compares the physical quantity corresponding to each output image with a predetermined evaluation index of the physical quantity. For example, the evaluation index comparison unit 18 calculates a square error between the physical quantity and the corresponding evaluation index. Note that the physical quantity and the evaluation index may be compared by a method other than the square error.

The weight calculation unit 19 calculates the weight of each channel based on the comparison result between the physical quantity and the corresponding evaluation index. In a more specific example, the weight calculation unit 19 calculates the weight for each channel so as to minimize the square error between the physical quantity and the corresponding evaluation index.

The image composition unit 11 adjusts the resolution, size, luminance, color, and the like of the output image of each channel according to the magnitude of the weight, generates a new output image for each channel, and combines the generated new output images to generate a composite output image.

Figure 13:
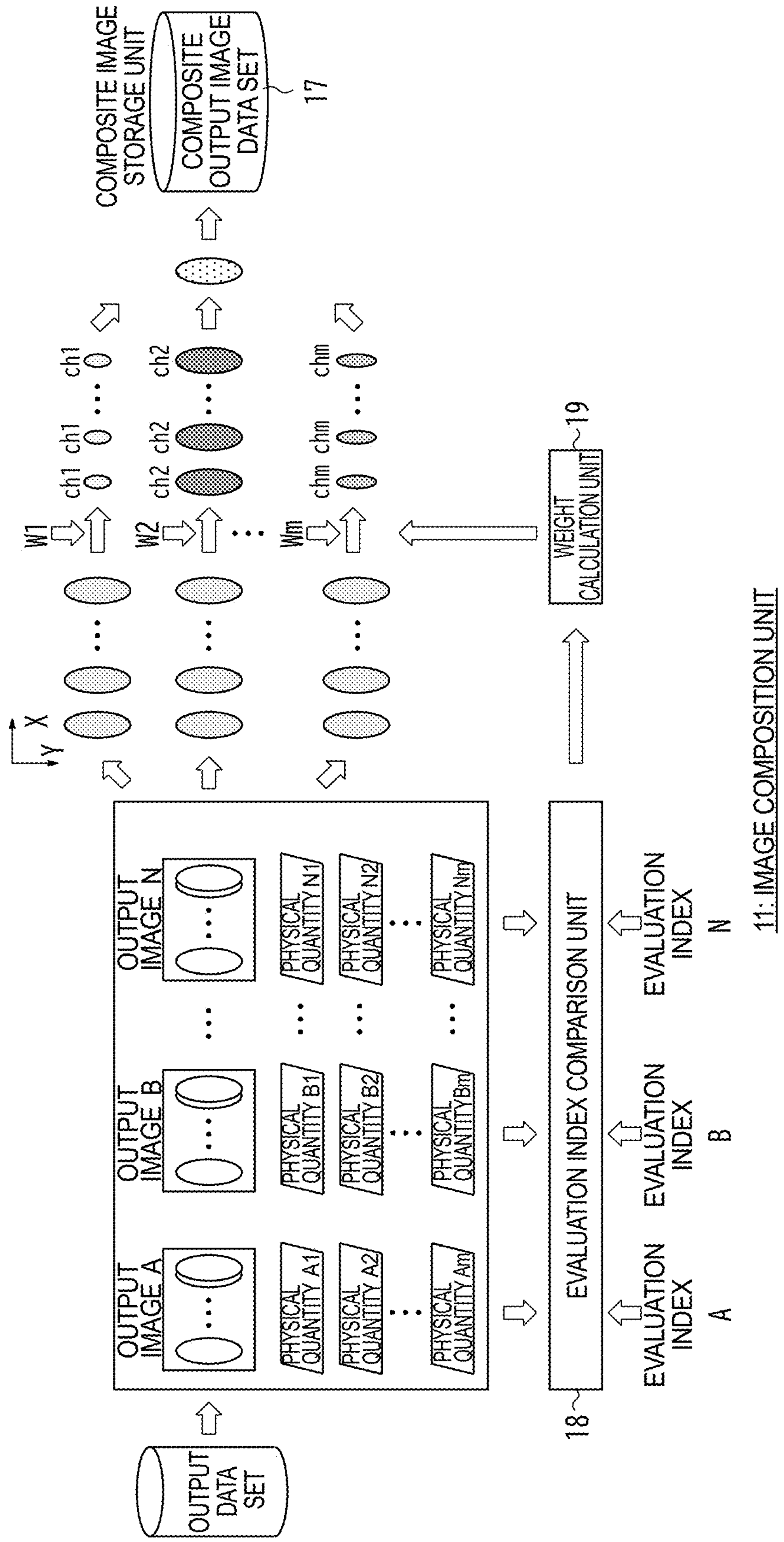
FIG. 13 is a diagram illustrating image composition processing according to a third example performed by the image composition unit.

FIG. 13 is a diagram illustrating image composition processing according to a third example performed by the image composition unit 11. In the third example, the output data set includes a plurality of pieces of output data. Each piece of output data includes a plurality of output images and a plurality of physical quantities. The plurality of pieces of output data included in the output data set are, for example, output data relating to a plurality of processing targets manufactured in the same lot. As illustrated in FIG. 13, the plurality of output images are classified into a first direction X and a second direction Y. The second direction Y represents the type of channel. Here, each channel corresponds to each processing target. A plurality of output images for different processing targets are classified into different channels. In the first direction X, a plurality of output images A to N relating to different pieces of information about the same processing target are arranged.

In the third example, the processing targets are classified into the different channels, and the plurality of output images A to N arranged in the first direction X are generated for each processing target. All of the plurality of output images for each of the plurality of processing targets are combined to generate a composite output image. The composite output image may be one image or a bundle of a plurality of output images.

The plurality of output images arranged in the first direction X are images having different types of information for the same processing target. For example, the output image A represents an image of a flow rate map, and the output image B represents an image of a concentration map.

The evaluation index comparison unit 18 compares evaluation indexes A to N set for the output images A to N with each physical quantity. For example, the evaluation index comparison unit 18 calculates a square error between the evaluation index A and each of physical quantities A1 to Am. Similarly, for the evaluation indexes B to N, a square error between the evaluation index and the corresponding physical quantity is calculated. The weight calculation unit 19 calculates weights W1 to Wm for the channels based on the plurality of square errors calculated by the evaluation index comparison unit 18. The image composition unit 11 generates a new output image for each channel based on the weights W1 to Wm calculated by the weight calculation unit 19, and combines the generated new output images to generate a composite output image.

According to the third example, an information amount of the composite output image can be increased as compared with the first example and the second example, and a wide variety of feature amounts can be extracted.

As described above, in the present embodiment, the first reference feature amount is generated based on the physical quantity corresponding to the output image, the second reference feature amount is generated based on the first reference feature amount and the feature amount of the output image, the degree of similarity between the second reference feature amount and the feature amount of the output image is calculated, and the input parameter for the next experiment or simulation is determined based on the evaluation value in which the degree of similarity and the physical quantity of the output image are made into a set. As a result, the input parameter can be optimized.

According to the present embodiment, since the first reference feature amount can be generated based on the user's knowledge, the input parameter can be determined in consideration of the user's knowledge. On the other hand, in the present embodiment, since the reference image and the user's knowledge are not necessarily required when the first reference feature amount is generated, the user's trouble can be saved, and the first reference feature amount can be generated by automated processing. In addition, when the feature amount of the output image is extracted, a composite output image can be used. The composite output image can include various types of information, and the input parameter can be optimized using the composite output image including information about complex physical quantities. As a result, even multi-dimensional input parameters can be optimized in a short time.

At least a part of the information processing apparatus 1 described in the above-described embodiment may be configured by hardware or software. In a case where the information processing apparatus 1 is configured by software, a program for realizing at least some functions of the information processing apparatus 1 may be stored in a recording medium such as a flexible disk or a CD-ROM, and may be read and executed by a computer. The recording medium is not limited to a removable recording medium such as a magnetic disk or an optical disk, and may be a fixed recording medium such as a hard disk device or a memory.

In addition, the program for realizing at least some functions of the information processing apparatus 1 may be distributed via a communication line (including wireless communication) such as the Internet. Further, the program may be distributed via a wired line or a wireless line such as the Internet or stored in a recording medium in an encrypted, modulated, or compressed state.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

The invention claimed is:

1. An information processing apparatus comprising processing circuitry configured to:

acquire output data obtained by performing an experiment or simulation based on an input parameter and a physical quantity of the output data;

input the output data to a learned model to extract a feature amount of the output data;

generate a first reference feature amount;

generate a second reference feature amount based on the physical quantity of the output data and a degree of similarity between the first reference feature amount and the feature amount of the output data;

calculate a degree of similarity between the second reference feature amount and the feature amount of the output data, to set an evaluation value based on the calculated degree of similarity and the physical quantity of the output data;

determine an input parameter for a next experiment or simulation based on the evaluation value; and repeat processing of acquiring the output data, inputting the output data to extract the feature amount, generating the first reference feature amount, generating the second reference feature amount, calculating the degree of similarity to set the evaluation value, and determining the input parameter until a predetermined condition is satisfied.

2. The information processing apparatus according to claim 1, wherein the second reference feature amount is generated based on the degree of similarity between the first reference feature amount and the feature amount of the output data and a physical quantity satisfying a predetermined condition among physical quantities of the output data.

3. The information processing apparatus according to claim 1, wherein the physical quantity includes a flow rate or a concentration of a processing medium used in a manufacturing apparatus that manufactures a processing target.

4. The information processing apparatus according to claim 1, wherein the output data includes an output image and the physical quantity corresponding to the output image.

5. The information processing apparatus according to claim 4, wherein the processing circuitry is further configured to generate a plurality of the output images for each of a plurality of channels corresponding to a plurality of processing targets and to generate a composite output image by combining the plurality of output images.

6. The information processing apparatus according to claim 5, wherein a data amount is reduced by performing a grayscale conversion on the plurality of output images, and then image processing according to each of the plurality of channels is performed.

7. The information processing apparatus according to claim 5, wherein the plurality of output images is generated by changing a weight for each of the plurality of channels.

8. The information processing apparatus according to claim 7, wherein the processing circuitry is further configured to calculate a plurality of weights corresponding to the plurality of channels based on the plurality of physical quantities corresponding to the plurality of output images and a predetermined evaluation index, and the plurality of output images is generated based on the plurality of weights.

9. The information processing apparatus according to claim 8, wherein the plurality of weights are calculated so as to minimize a square error between each of the plurality of physical quantities and the evaluation index.

10. The information processing apparatus according to claim 5, wherein the plurality of output images are images for different processing targets.

11. The information processing apparatus according to claim 10, wherein each of the plurality of output images includes a plurality of images relating to different types of information about the corresponding processing target.

12. The information processing apparatus according to claim 11, wherein the plurality of images are images representing distributions of different physical quantities.

13. The information processing apparatus according to claim 10, wherein a plurality of the output images corresponding to a plurality of the processing targets included in one lot are classified into different channels.

14. The information processing apparatus according to claim 5, wherein the composite output image is input to the model and a feature amount of the composite output image is extracted, and the degree of similarity is calculated between the second reference feature amount and the feature amount of the composite output image, and the evaluation value of the composite output image is set based on the calculated degree of similarity and a physical quantity of the composite output image.

15. The information processing apparatus according to claim 4, wherein the first reference feature amount is generated from a reference image based on user's knowledge.

16. The information processing apparatus according to claim 4, wherein the first reference feature amount is generated based on a feature amount of one or more of the output images corresponding to a physical quantity satisfying a predetermined condition among a plurality of the physical quantities corresponding to a plurality of the output images.

17. The information processing apparatus according to claim 4, wherein the processing circuitry is further configured to calculate contribution rates of the plurality of physical quantities based on the calculated plurality of degrees of similarity and variations of the plurality of physical quantities corresponding to the plurality of output images, and wherein the second reference feature amount is generated based on the plurality of degrees of similarity and the plurality of physical quantities at a use rate set based on the contribution rates of the plurality of physical quantities.

18. The information processing apparatus according to claim 1, wherein the processing circuitry is further configured to set a feature amount to be excluded, and at least one of the first reference feature amount and the second reference feature amount is generated by excluding the set feature amount.

19. The information processing apparatus according to claim 1, further comprising a storage configured to store the acquired output data, the physical quantity of the output data, and the input parameter corresponding to the output data as a set.

20. An information processing method comprising:

acquiring output data obtained by performing an experiment or simulation based on an input parameter and a physical quantity of the output data;

inputting the output data to a learned model and extracting a feature amount of the output data;

generating a first reference feature amount;

generating a second reference feature amount based on the physical quantity of the output data and a degree of similarity between the first reference feature amount and the feature amount of the output data;

calculating a degree of similarity between the second reference feature amount and the feature amount of the output data, and setting an evaluation value based on the calculated degree of similarity and the physical quantity of the output data; and determining an input parameter for a next experiment or simulation based on the evaluation value, wherein acquiring the output data and the physical quantity of the output data, inputting the output data, extracting the feature amount of the output data, generating the first reference feature amount, generating the second reference feature amount, calculating the degree of similarity, setting the evaluation value, and determining the input parameter are repeated until a predetermined condition is satisfied.

* * * * *